United States Patent [19]

Schoenrock et al.

[11] 4,001,113
[45] Jan. 4, 1977

[54] ION EXCHANGE METHOD

[75] Inventors: Karlheinz W. R. Schoenrock; Hugh G. Rounds, both of Ogden, Utah

[73] Assignee: The Amalgamated Sugar Company, Ogden, Utah

[22] Filed: Mar. 2, 1976

[21] Appl. No.: 663,200

Related U.S. Application Data

[63] Continuation of Ser. No. 544,712, Jan. 28, 1975, abandoned, which is a continuation of Ser. No. 356,998, May 3, 1973, abandoned.

[52] U.S. Cl. .................................. 210/33; 210/35; 210/189; 210/275
[51] Int. Cl.² ........................................ B01D 15/06
[58] Field of Search .............. 210/33, 35, 189, 252, 210/255, 257 R, 258, 275, 279, 284, 287, 333 R, 333 A, 335

[56] References Cited
UNITED STATES PATENTS

| | | | |
|---|---|---|---|
| 1,745,421 | 2/1930 | Higgins | 210/287 |
| 1,903,958 | 4/1933 | Clark | 210/189 |
| 2,217,692 | 10/1940 | McGill | 210/189 |
| 3,855,123 | 12/1974 | Strudgeon et al. | 210/35 |

*Primary Examiner*—Frank A. Spear, Jr.
*Assistant Examiner*—Ivars Cintins
*Attorney, Agent, or Firm*—Pierce, Scheffler & Parker

[57] ABSTRACT

The invention is concerned with an ion exchange treating system wherein two or more exchanger or absorber vessels are connected in series, each vessel being filled with ion exchange resin leaving sufficient freeboard to allow for expansion of the medium. Each vessel is provided with an expansion chamber positioned above it and includes a conventional distribution system. The flow of liquids passing through the system is countercurrent with respect to the medium to be treated and the medium which regenerates the ion exchanger or absorber. Generally, the liquid to be treated enters the first vessel at the bottom, exiting from the top, entering the second vessel at the top and exiting therefrom at the bottom.

3 Claims, 4 Drawing Figures

ION EXCHANGE METHOD

This is a continuation of application Ser. No. 544,712 filed Jan. 28, 1975 which is a continuation of application Ser. No. 356,998 filed May 3, 1973, both now abandoned.

This invention relates to the art of ion exchange adsorbtion and absorbtion, and more particularly to ion exchange methods.

In the conventional ion exchange methods a pressure vessel is usually loaded with a stationary bed of ion exchange resin to a point where more than about 50% of so-called freeboard is retained in the vessel. This freeboard is normally required to allow expansion of the resin bed during backwashing. In such a conventional process the process liquors percolate through the bed of ion exchange resin, usually in the downflow fashion cocurrent between the alternating liquors.

It is also known that some installations alternate the liquors passing through the ion exchanger in a countercurrent flow pattern by allowing a fluidized bed when proceeding upflow or by reducing flow to minimize bed fluidization. Other modifications in ion exchange methods and apparatus are known which attempt continuous operation rather than the conventional batch type system. The objective of all these modifications on the conventional ion exchange method and apparatus is to improve efficiency of operation.

Conventional ion exchange processes suffer one or more of the following shortcomings which increase their investment and operating costs, and which may limit their application in many areas where it would be used if these shortcomings could be eliminated:

1. Cocurrent flow or countercurrent flow through a partially fluidized bed, respectively, of the alternating liquids which have to be passed through an ion exchange bed for exhaustion and regeneration, respectively, is inefficient. The ion exchange resin is only partially utilized and a large excess of regenerant must be applied to convert the ion exchanger to the regenerated form under these conditions.

2. Because of the inefficient operation, the size of the plant must be substantially larger than theoretically necessary.

3. Cocurrent flow compacts the resin bed and requires frequent backwashings (1 – 2 backwashings per cycle). These backwashings require large quantities of water which normally have to be disposed of, hence creating also a disposal problem. Furthermore, backwashing represents a significant portion of the total turn-around time, hence reducing the time an ion exchanger may be used for actual exchange. This must be taken into consideration for plant design and results in significantly enlarged investment cost.

4. The pressure drop through an ion exchange bed limits the height of the column and, hence, the amount of ion exchange resin that may be utilized in a single stream. Therefore, some installations with a large flow to be treated require split stream operation, thus doubling investment cost. Such cycles are also relatively short, because of the limited amount of resin which may be charged into a single vessel. Short cycles dictate frequent interface fronts between dissimilar solutions passing through the ion exchange column, hence causing dilution of product and non-productive cycle lengthening because of lengthy rinses and washings.

5. In the conventional ion exchange system, it is unavoidable to mix make-up resin with resin which has already been degraded through repeated heavy use since it is economically not acceptable to replace the whole lot of partially degraded ion exchange resin.

We have found that practice of the principles of the present invention greatly reduces the effects of the above shortcomings, thereby allowing improved process efficiency, flexibility and ease of operation for any type of ion exchange or absorbtion process, whilst at the same time holding down investment costs.

The ion exchange apparatus for carrying out the present invention comprises one vessel, or, preferably two or more vessels, each of which is filled with ion exchange resin or absorber, allowing only sufficient freeboard for expansion of the resin bed due to normal swelling as the ion exchange resin is converted from one form to another. Liquids are introduced into or drained out of the resin bed, either from the top or from the bottom, respectively, through a distribution system which may take any conventional form such as nozzles, screened radials, or even gravel bed support on the bottom, as long as proper consideration is given to uniform cross-sectional distribution of the liquid introduced or drained, respectively. Even a screened pipe opening will be operable within the scope of this invention, provided uniform cross-sectional distribution through the drainage system of the vessel containing the ion exchange resin is not of significance. It is important, however, that the free openings of the inlet or outlet, respectively, to or from the vessel which are in contact with the ion exchange resin be of such size as to retain the latter within the vessel. The diameter of the ion exchange column is limited only by structural consideration. The height of the column is limited by the pressure drop across the resin bed, which pressure drop depends upon the exchanger or absorber being used, the liquor being treated, and the respective flow rate of the liquor.

Two or more such vessels may be connected in series, with the liquid to be treated entering Vessel No. 1 at the bottom, percolating upflow and exiting from the top of Vessel No. 1; thence entering the top of Vessel No. 2 to percolate downflow and draining out of the bottom of Vessel No. 2. The flow may be taken to additional vessels in the same alternating up and down flow pattern as explained for Vessels 1 and 2, with each additional vessel following this established flow pattern. For most operations only two such vessels need be connected in series for efficient operation, but the invention is not limited as to the number of such vessels, columns, or cells connected in series.

Upon termination of percolation of the liquor to be treated, or when the ion exchange resin or absorber is exhausted with respect to the chemical species exchanged or absorbed, the regenerating medium may be passed through each respective vessel in a flow pattern countercurrent to that of the liquor treated; e.g., entering the last vessel at a point where the treated liquor exited last.

It should be understood that the flow must not alternate up and down with each additonal vessel, but the flow exiting from the top of Vessel No. 1 may be moved to the bottom of Vessel No. 2 for up-flow percolation, hence providing consecutive upflow through each vessel for one type of liquor and consecutive but countercurrent downflow for the other type of liquid passing through the various vessels. It is also a matter of choice which of the liquors should flow only upflow and which should be arranged for downflow operation. However, the alternating up and down flow pattern explained first is the preferred choice for most operations, since it minimizes required pipe lines as well as having other advantages. For a third variation of the countercurrent series flow, the vessels may be stacked on top of each other.

If required because of the nature of the substance to be treated via ion exchange such as viscosity, etc., or the number of vessels connected in series for long exhaustion runs, respectively, it may be desirable to install in line booster pumps between vessels connected in series to avoid excessive pressures on the primary resin bed, - otherwise understandably high pressures on the primary resin bed may be necessary in order to maintain desirable flow rates in forcing the solution through two or more vessels connected in series.

The alternating up and down flow combined with the countercurrent flow pattern of the various liquids passing through such a system result in obtaining the highest possible exchange efficiency either during exhaustion or regeneration, respectively, and prevent compaction of the ion exchange beds.

An outlet may be provided at the top of each vessel to allow connection to an external non-pressurized expansion chamber. The top outlet may represent between 0.3 % and 10 % of the total cross-sectional area of the vessel, and allows expansion of the resin bed into the expansion chamber located above the ion exchange vessel for the purpose of backwashing if such is desired. A single expansion chamber may be connected to several ion exchange vessels. Preferably, no more than four ion exchange vessels arranged in cloverleaf formation should be connected to one expansion chamber. However, each ion exchange vessel may be connected to its own expansion chamber or a large expansion chamber my be compartmented accordingly. The expansion chamber may vary in size between one-half and two times the size of its respective ion exchange vessel, depending upon the type of ion exchange resin under consideration and the expansion of the ion exchange resin desired. The expansion chamber should be equipped with an overflow; preferably a peripheral overflow or central downtake overflow, respectively.

The invention will now be further described in the following exposition, taken in conjunction with the appended drawing, in which FIG. 1 is a schematic representation of an apparatus in the form for use in carrying out the product treatment step of the process of the invention;

Figure 1:
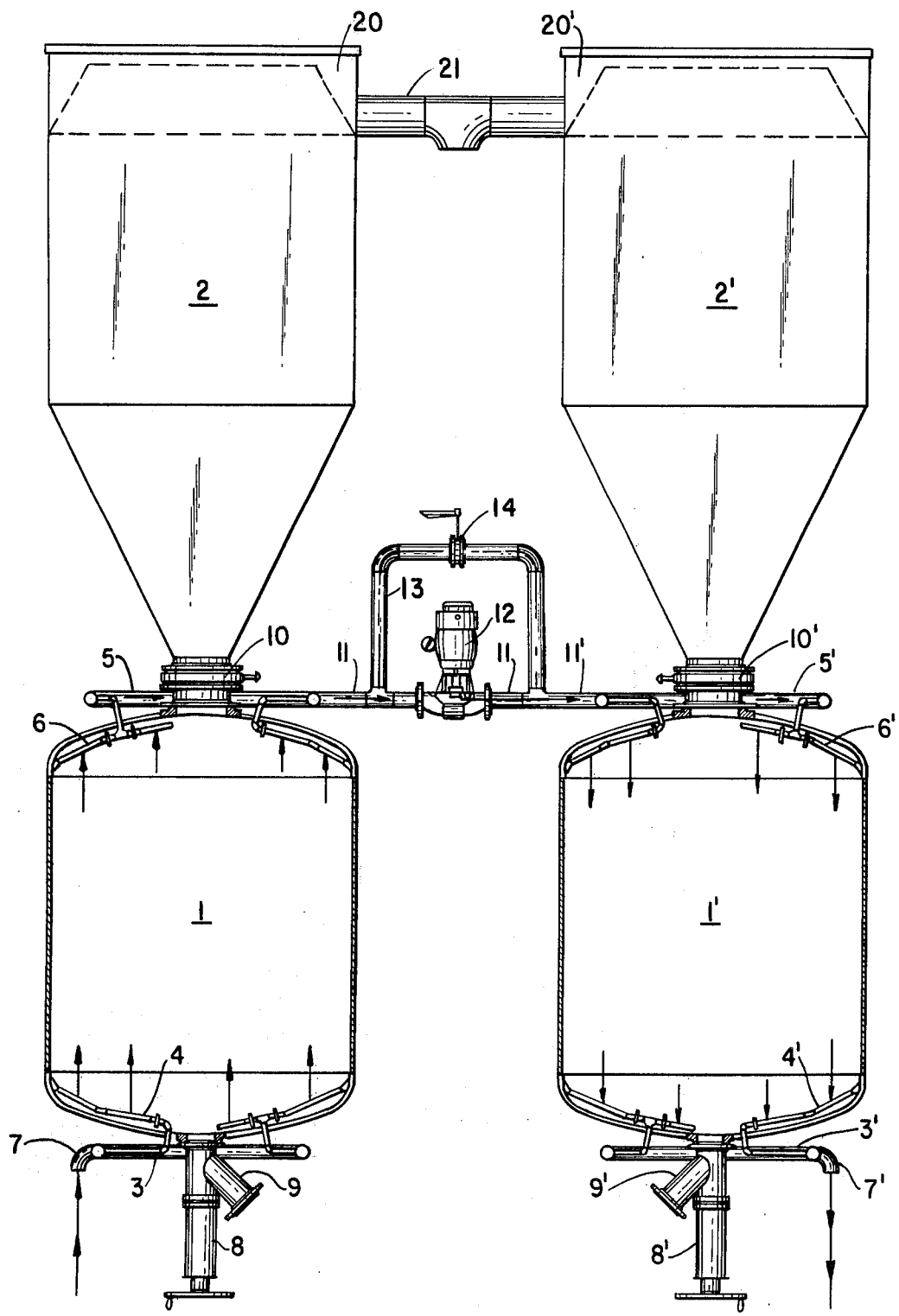
Figure 2:
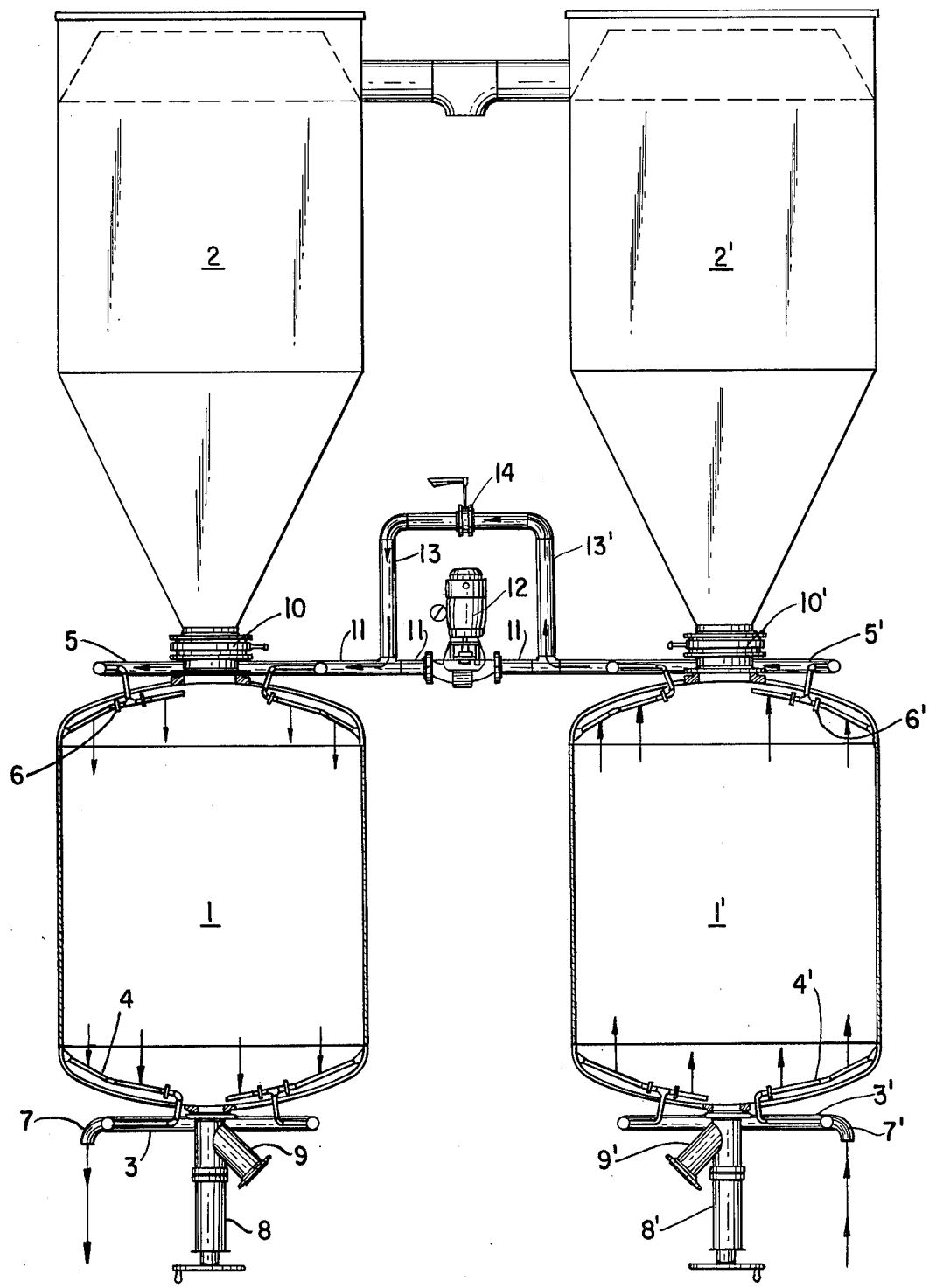
FIG. 2 shows the same apparatus as that in FIG. 1 but arranged to carry out the regeneration and rinse step.
Figure 3:
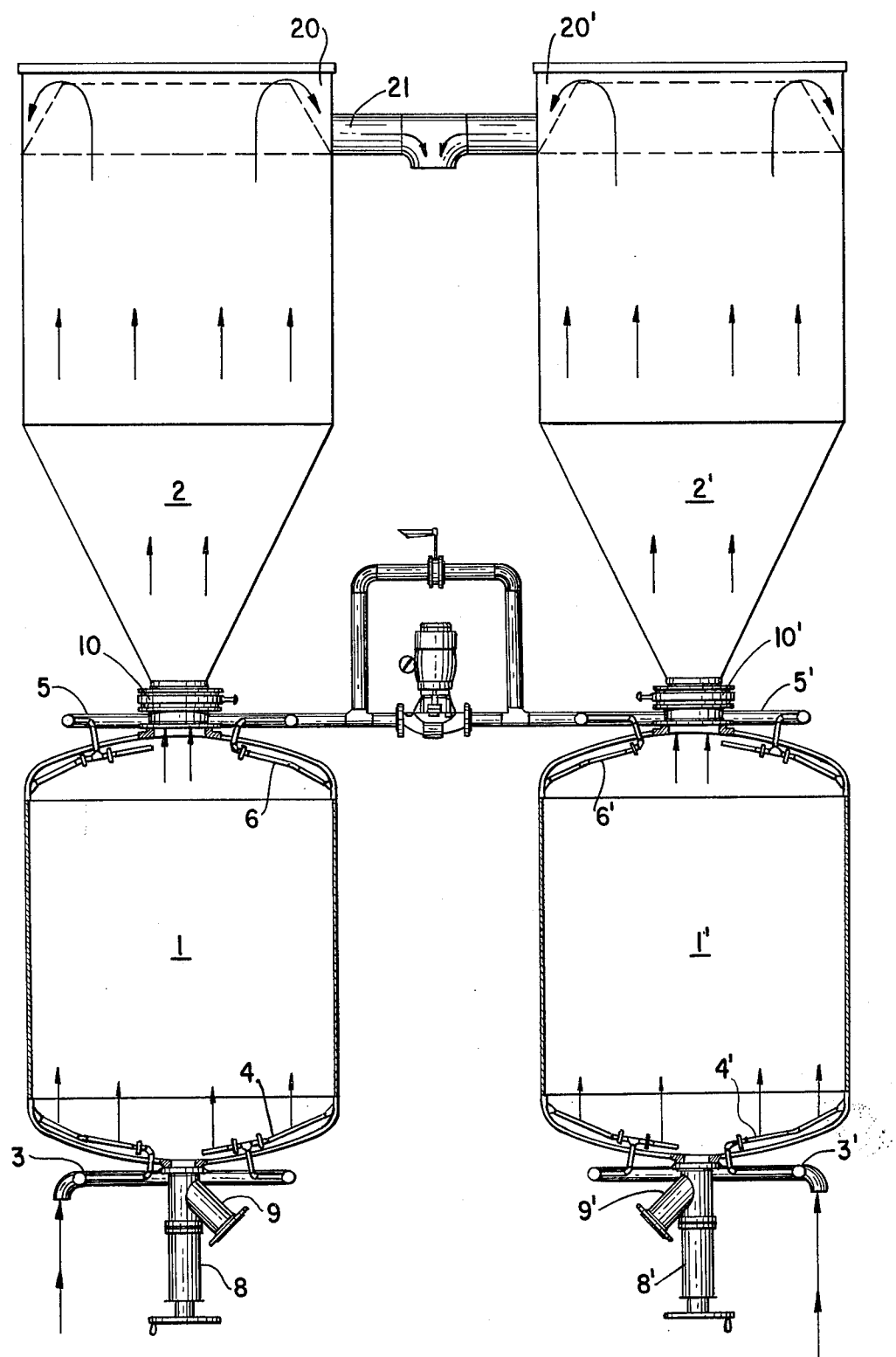
FIG. 3 shows the same apparatus as arranged to carry out the backwash step.

In FIGS. 1-3 there are disclosed the basic components of one complete unit of apparatus for carrying out the process aspect of this invention, the same consisting of two associated similar assemblies. Each such assembly includes an ion exchange cell 1 (or 1') provided with an expansion chamber 2 (or 2') which cell and chamber communicate through a valve 10 (or 10'). The ion exchange cell is fitted with a bottom header 3 (or 3') and associated assembly of radial distributors 4 (or 4'), and also with a top header 5 (or 5') and associated assembly of radial distributors 6 (or 6'). A pipe 7 (or 7') leads from a source (not shown) to bottom header 3. At 9 (or 9') is indicated a drain controlled by a valve 8 (or 8').

Top headers 5, 5' are connected by a conduit 11, 11' in which there is integrated an inline booster pump 12. A by-pass line 13, 13' leads from 11 to 11' avoiding pump 12, said by-pass line including therein a by-pass valve 14.

Expansion chambers 2, 2' are equipped with overflow channels 20, 20' which overflow channels communicate through overflow conduit 21'.

Cells 1, 1' are, in use, filled with ion exchange resin bodies.

Figure 4:
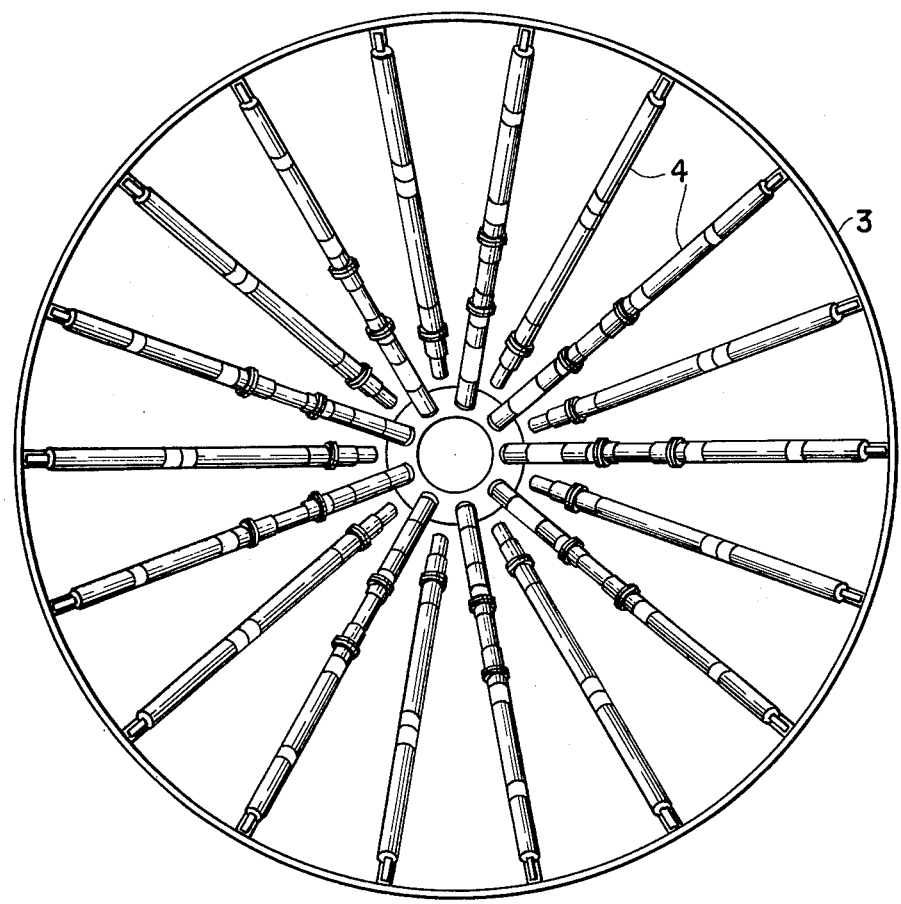
FIG. 4 is a detailed view of the arrangement of radial distributors in the ion exchange cell compartment of the apparatus.

FIG. 4 illustrates a cross sectional view of screened radials. This is a typical form of an internal distributor system either upper or lower suitable for the ion exchange cell.

In carrying out the product treatment and sweet off operation, exhaustant liquor is caused to traverse the unit via inlet pipe 7, bottom header 3 and its associated distributors 4 into and through a body of ion exchange resin filling cell 1; thence via upper distributors 6, top header 5, conduit 11, 13, valve 14, conduit 13' and conduit 11', top headers 5' and associated distributors 6' into and through cell 1' (which, like cell 1, is filled with ion exchange resins), and exits from the unit via distributors 4', bottom header 31 and exit pipe 9'. In this step, valves 10, 10' as well as 8, 8', respectively, are closed.

If and when an undue pressure drop in pipe 11, 11' occurs, valve 14 is closed and inline booster pump 12 is operated to induce a desired flow through the system.

In the succeeding regeneration and rinse operation (see FIG. 2) regenerant liquid traverses the unit, in reverse direction, viz., via pipe 7', header 3' and distributors 4' into and through cell 1, the cross-over communications, and into and through cell 1, exiting at exit pipe 7.

When backwashing is to be effected, valves 10, 10' are opened, and backwash liquid is forced via bottom header 3, 3' and distributor 4, 4' through cells 1, 1' and valves 10, 10' and thence into expansion chambers 2, 2', overflowing at 20, 20' into overflow conduit 21 and thence to a recovery system if so desired.

The exchanger or absorber is allowed to drain back from the expansion chamber 2, 2' into cell 1, 1' after termination of backwashing by draining liquid through distributor 4, 4', header 3, 3' and pipe 7, 7'. Valves 10, 10' are closed when the exchanger has settled back in cells 1, 1'.

A valve and header system downstream from pipes 7, 7' controls the various liquid flows entering or exiting through pipes 7, 7' during the various operating steps.

Valves 8, 8' serve to drain the ion exchanger or absorber for inspection of the cell interior, maintenance or replacement of the exchanger. Make up of the exchanger is added via expansion chamber 2, 2' to enter the cell through valve 10, 10'.

We claim:

1. A method for conducting an ion exchange operation comprising
    a. providing a system comprising at least two pressure vessels connected in series; each of said vessels containing a body of particulate ion exchange material substantially filling said vessel save for sufficient freeboard to allow for the swelling of said exchange material during use; passage means proximate the lower and upper ends of each said vessel providing entrance and exit of fluid to be passed through said vessels whilst retaining within said vessels said bodies of exchange material; each said vessel having a central opening in the top thereof; a non-pressurized expansion chamber located above said vessel and connected to said central opening to allow the entrance of said exchange material from said vessel to said expansion chamber during back wash and drainage of said exchange material back into said vessel after back wash, said central opening being provided with a valve which controls communication between said vessel and said expansion chamber; said expansion chamber being provided with a down take overflow at its top for discharge of back wash water;

b. closing said valves in said central openings, c. passing an exhaustant liquid into a first said pressure vessel at the bottom thereof and upwardly through said body of exchange material therein, said exhaustant liquid exiting from said first pressure vessel at the top thereof;

d. passing said exhaustant liquid to the top of a second pressure vessel and downwardly through the body of exchange material therein, exiting at the bottom of said second vessel, e. following the pattern so established for as many vessels as are connected in series;

f. thereafter passing a regenerant liquid in the aforesaid pattern counter current to the exhaustant liquid which regenerant liquid enters at the point where the exhaustant liquid exits and exits where the exhaustant liquid enters the system;

g. opening said valves in said central openings;

h. passing a back wash liquid into each of said vessels at the bottom thereof and upwardly through said body of exchange material therein, said back wash liquid exiting from each of said vessels at the top thereof;

i. passing said back wash liquid upwardly through said expansion chambers whereby causing said body of exchange material to expand into said expansion chamber;

j. passing said back wash liquid upward through said expansion chambers to said down take overflow where said back wash exits from said expansion chamber;

k. terminating the flow of said back wash liquid to permit said body of exchange material to settle back into said vessels; and l. repeating steps (b) through (k).

2. The process as set forth in claim 1, wherein said expansion chamber comprises a single expansion chamber common to all of said vessels and said exchange material of said pressure vessels expand into said expansion chamber.

3. The process as set forth in claim 1, wherein said expansion chamber comprises a separate expansion chamber for each of said vessels and said exchange material of each vessel expands into its related expansion chamber.

* * * * *